(12) United States Patent
Chari

(10) Patent No.: US 8,305,916 B2
(45) Date of Patent: Nov. 6, 2012

(54) WIRELESS DATA PACKET CLASSIFICATION OF AN IDENTIFIED FLOW OF DATA PACKETS

(75) Inventor: Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 166 days.

(21) Appl. No.: 11/973,027

(22) Filed: Oct. 5, 2007

(65) Prior Publication Data

US 2008/0192629 A1    Aug. 14, 2008

(51) Int. Cl.
*G01R 31/08* (2006.01)
(52) U.S. Cl. ........................................ 370/252
(58) Field of Classification Search ............ 370/230, 370/238, 229, 389, 235, 310, 392, 252, 351
See application file for complete search history.

(56) References Cited

U.S. PATENT DOCUMENTS

| | | | |
|---|---|---|---|
| 5,563,881 A | 10/1996 | Perelman et al. | |
| 5,740,366 A | 4/1998 | Mahany et al. | |
| 5,987,011 A | 11/1999 | Toh | |
| 6,046,992 A | 4/2000 | Meier et al. | |
| 6,104,700 A * | 8/2000 | Haddock et al. | 370/235 |
| 6,298,053 B1 | 10/2001 | Flammer, III et al. | |
| 6,567,408 B1 | 5/2003 | Terry et al. | |
| 6,704,301 B2 | 3/2004 | Chari et al. | |
| 6,728,514 B2 | 4/2004 | Bandeira et al. | |
| 6,804,532 B1 | 10/2004 | Moon et al. | |
| 6,850,502 B1 | 2/2005 | Kagan et al. | |
| 6,965,575 B2 | 11/2005 | Srikrishna et al. | |
| 6,973,039 B2 | 12/2005 | Redi et al. | |
| 7,050,403 B2 * | 5/2006 | Mononen | 370/252 |
| 7,782,872 B2 * | 8/2010 | Rinne | 370/395.43 |
| 2005/0135268 A1 | 6/2005 | Simon | |
| 2006/0184664 A1 * | 8/2006 | Jung | 709/224 |
| 2006/0234678 A1 | 10/2006 | Juitt | |
| 2007/0002804 A1 | 1/2007 | Xiong | |
| 2007/0030826 A1 * | 2/2007 | Zhang et al. | 370/331 |
| 2007/0058632 A1 | 3/2007 | Back | |
| 2007/0140246 A1 | 6/2007 | Rajagopalan | |
| 2007/0171868 A1 * | 7/2007 | Furuskar et al. | 370/331 |
| 2007/0242627 A1 * | 10/2007 | Thai et al. | 370/278 |
| 2008/0101233 A1 * | 5/2008 | Shi et al. | 370/235 |

* cited by examiner

*Primary Examiner* — Kwang B Yao
*Assistant Examiner* — Anh Ngoc Nguyen
(74) *Attorney, Agent, or Firm* — Brian R. Short (57) ABSTRACT

An apparatus and method of classifying data packets is disclosed. One method includes a wireless access node identifying a flow of data packets based on source and destination addresses of the data packets. The wireless access node classifies the data packets of the identified flow of data packets as requiring a predetermined quality of service by determining if the identified flow of data packets comprise an inter-arrival time less than a first inter-arrival threshold.

23 Claims, 6 Drawing Sheets

Means for identifying a flow of data packets based on source and destination addresses of the data packets Means for classifying data packets of the identified flow of data packets as requiring a predetermined quality of service Means for determining if the identified flow of data packets comprise an inter-arrival time less than a first inter-arrival threshold, or if the identified flow of data packets comprises data packets having a size less than a first packet size threshold

Access Node
510

WIRELESS DATA PACKET CLASSIFICATION OF AN IDENTIFIED FLOW OF DATA PACKETS

FIELD OF THE EMBODIMENTS

The described embodiments relate generally to wireless communications. More particularly, the described embodiments relate to a method and apparatus for classifying wireless data packets.

BACKGROUND

Wireless mesh networks typically support multiple different applications including video, voice and data. Different applications have different traffic characteristics and different requirements. For example, voice traffic is sensitive to delays, jitter and packet loss. Long packet delays or latencies can adversely affect the end-user perception of voice quality. Similarly high levels of packet loss or jitter can adversely impact the end-user perception of voice quality. High levels of packet loss or high latencies can also result in calls being dropped, which is undesirable.

For this reason, it is frequently desirable to apply different levels of priority to different applications and to treat these classes of applications differently within the wireless mesh network. Various mechanisms to differently prioritize voice or video traffic exist. Additionally, several standards including IETF DiffServ and IEEE 802.11e have been developed to mark packets at Layer 3 and Layer 2 to distinguish between different classes of traffic so that they can be treated differently as they traverse the infrastructure.

Some standards do exist. For example, a device conforming to the IETF Diffserv standards applies DSCP tags to its IP packets to allow network infrastructure to identify the class of traffic being carried in the packet. A device conforming to the IEEE 802.11e standard applies 802.11e tags to its IP packets to allow network infrastructure to identify the class of traffic being carried in the packet.

However, adoption of these standards is not uniform. Several handsets and other mobile devices do not uniformly or correctly tag packets, making it difficult for the network infrastructure to accurately identify the type of traffic and to apply traffic prioritization rules based on the classification.

Further complicating the classification problem is the fact that many VoIP applications and implementations do not communicate over well-known ports but rather dynamically determine what ports to use as part of the call setup procedure. Some network infrastructure devices perform state-full packet inspection of packet flows to identify the ports to be used during the call based on snooping the initial control protocol exchanges. While this approach works well for many well-known VoIP implementations, it is limited in utility because several VoIP implementations encrypt control protocol exchanges, making them harder to snoop. In addition, voice implementations such as UMA carry phone calls over an IPSec VPN, making it hard or impossible to snoop the initial call-setup messages. Furthermore, stateful packet inspection is processing-intensive and may be hard to accomplish on processor-constrained systems.

It is desirable to have a system for reliably classifying voice calls over IP without relying on accurate tagging by the endpoints or relying on the ability to snoop call-setup exchanges.

SUMMARY

One embodiment includes a method of classifying data packets. The method includes a wireless access node identifying a flow of data packets based on source and destination addresses of the data packets. The wireless access node classifies the data packets of the identified flow of data packets as requiring a predetermined quality of service by determining if the identified flow of data packets comprise an inter-arrival time less than a first inter-arrival threshold.

Another embodiment includes a method of classifying data packets. The method includes the wireless access node identifying a flow of data packets based on source and destination addresses of the data packets. The wireless access node classifies data packets of the identified flow of data packets as requiring a predetermined quality of service by determining if the identified flow of data packets comprises data packets having a size less than a first packet size threshold.

Another embodiment includes a wireless access node. The wireless access node includes a means for identifying a flow of data packets based on source and destination addresses of the data packets, a means for classifying data packets of the identified flow of data packets as requiring a predetermined quality of service, and a means for determining if the identified flow of data packets includes an inter-arrival time less than a first inter-arrival threshold, or if the identified flow of data packets includes data packets having a size less than a first packet size threshold.

Other aspects and advantages of the described embodiments will become apparent from the following detailed description, taken in conjunction with the accompanying drawings, illustrating by way of example the principles of the described embodiments.

DETAILED DESCRIPTION

As shown in the drawings for purposes of illustration, the described embodiments provide for classifying data packets of a wireless network. Based on the classification, the wireless network can prioritize the data packets, select interfaces and forward the data packets.

Figure 1:
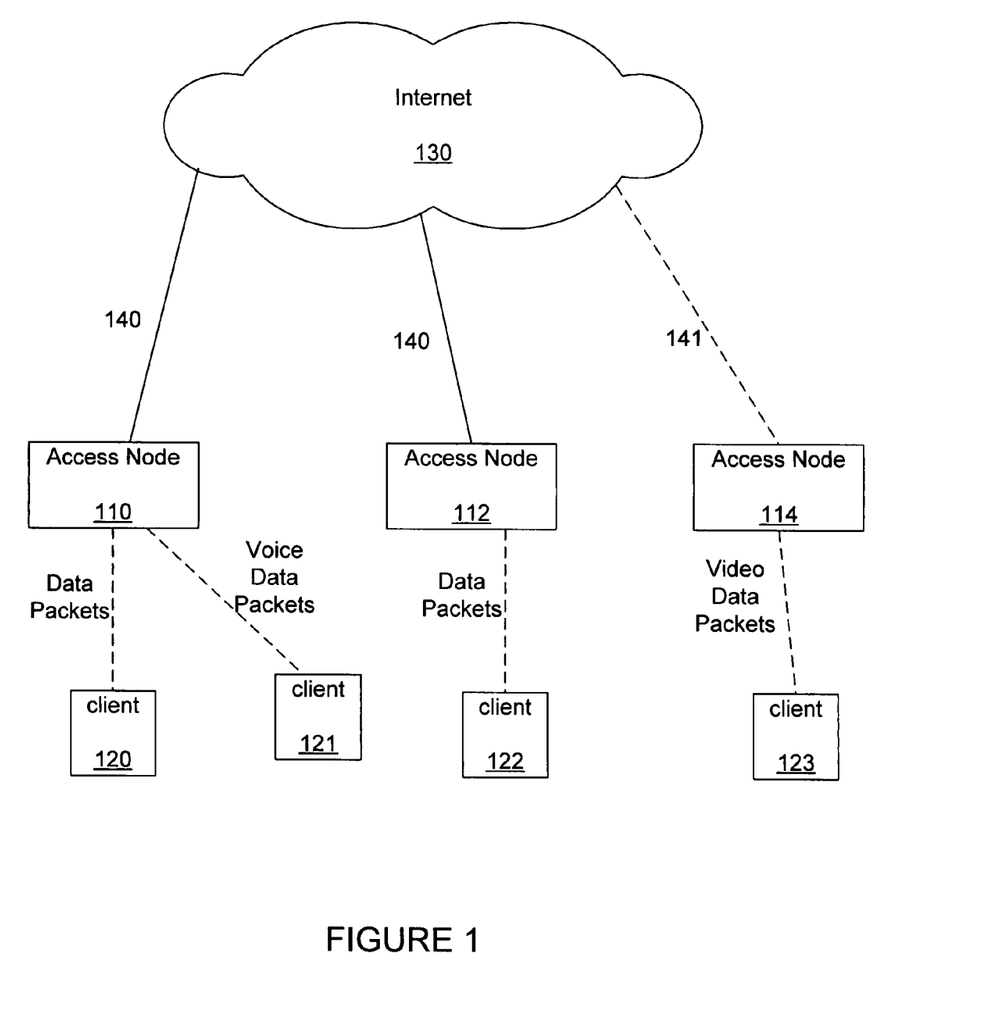
FIG. 1 shows an example of a wireless network that includes client devices that desire different levels of service depending upon the type of data packets of the different client devices.

FIG. 1 shows an example of a wireless network that includes client devices that need different levels of service depending upon the type of data packets of the different client devices. The network includes access nodes (access points) 110, 112, 114 that provide client devices 120, 121, 122, 123 with access to, for example, the internet 130. The access nodes 110, 112, 114 can be connected to a wired network through wired backhaul interfaces 140 or a wireless backhaul interface 141.

The client devices 120, 121, 122, 123 can include data packets that need (or require) different levels of service depending on, for example, the user applications being operated on the client devices 120, 121, 122, 123. For example, if the user application is internet surfing, the data packets can generally be buffered and time delayed without appreciably affecting the user application. However, if the user application includes, for example, voice data packets (VoIP), the buffering and time delaying of the voice data packets must be more rigidly controlled. That is, the voice data packets require a higher level of service than standard data packets. The access nodes can prioritize the data packets if the access nodes are aware of the type of data the data packets are carrying.

Figure 2:
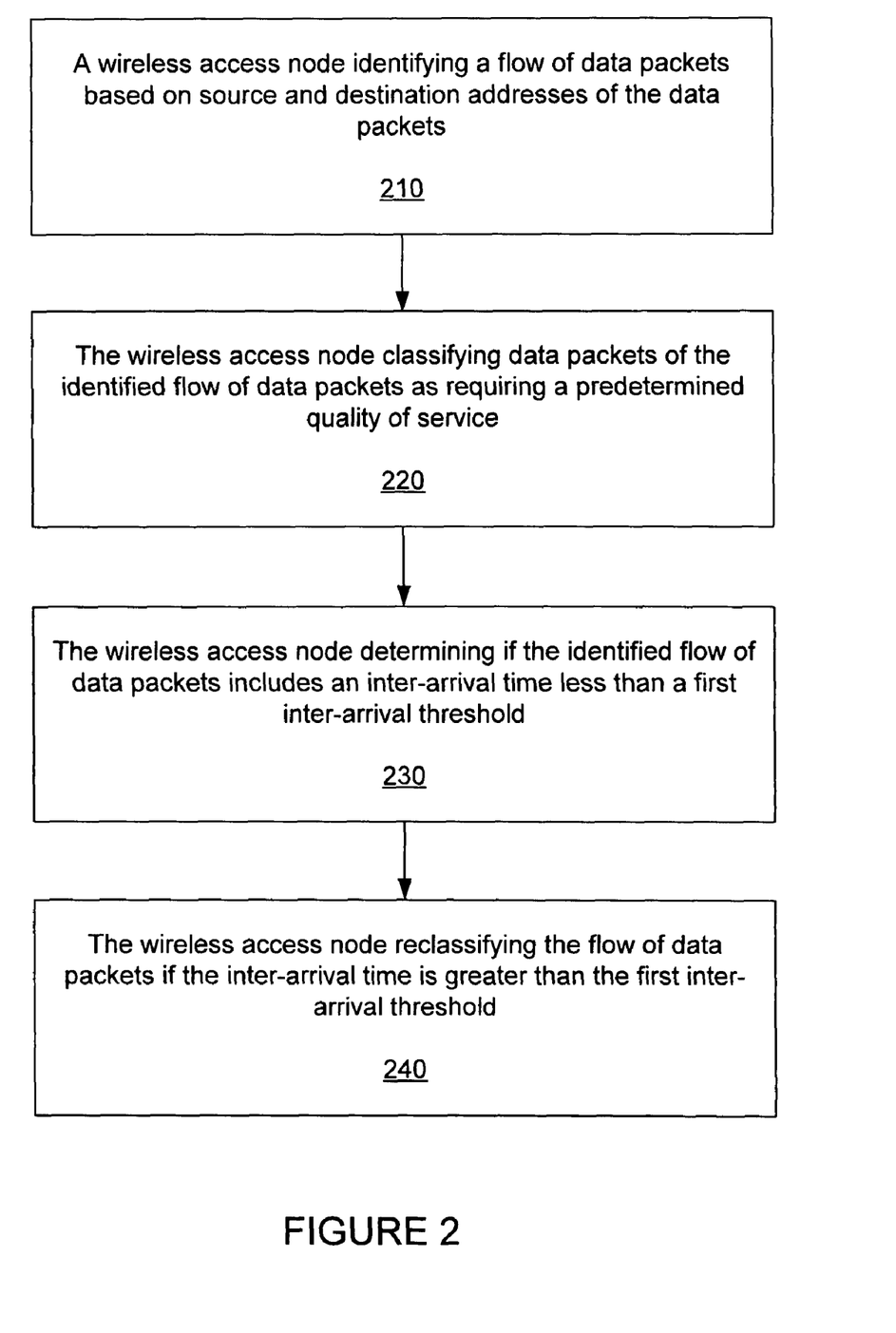
FIG. 2 is a flow chart that includes the steps of one example of a method of classifying data packets.

FIG. 2 is a flow chart that includes the steps of one example of a method of classifying data packets. A first step 210 includes a wireless access node identifying a flow of data packets based on source and destination addresses of the data packets. A second step 220 includes the wireless access node classifying data packets of the identified flow of data packets as requiring a predetermined quality of service. A third step 230 includes the wireless access node classifying the data packets by determining if the identified flow of data packets include an inter-arrival time less than a first inter-arrival threshold. A fourth step 240 includes reclassifying the flow of data packets if the inter-arrival time is greater than the first inter-arrival threshold.

The classification of the data packets of the identified flow of data packets can additionally include determining if the identified flow of data packets includes an inter-arrival time greater than a second inter-arrival threshold. For other embodiments, the classification can additionally include determining if the identified flow of data packets comprises data packets having a size greater than a first packet size threshold, and/or a size less than a second packet size threshold.

Generally, the wireless access node identifies a flow of data packets based on source and destination addresses of the data packets. More specifically, the wireless access node inspects source and destination addresses of the data packets and identifies a continual flow of data packets between inspected source and destination addresses. Another embodiment further includes the wireless access node verifies the flow of data packets is bi-directional between source and destination addresses by identifying a bi-directional flow of data packets based on source and destination addresses of the data packets. More specifically, the access node inspects source and destination addresses of the data packets and identifies a bi-directional continual flow of data packets between inspected source and destination addresses.

As previously mentioned, the wireless access node can reclassify the data packets if the inter-arrival time of the flow of data packets becomes greater than the first inter-arrival threshold. Additionally, the wireless access node can reclassify the flow of data packets if the data packets have a size greater than a first packet size threshold, and/or a size less than a second packet size threshold.

Once the access node has classified data packets of the identified flow of data packets as requiring the predetermined quality of service, an embodiment includes the access node tagging the classified data packets of the identified flow with Quality of Service tags, such as IETF DiffServ or 802.1p. Once tagged, other access node that subsequently receive the classified data packets do not have to go through this classification process. That is, the other access nodes can merely detect that a packet includes a Quality of Service tag, and treat the data packet according to the priority to be accorded to packets with that Quality of Service tag. As will be described, if the access node is within a wireless mesh network, the tagging of data packets can be useful because data packets commonly pass through several wireless access nodes before reaching a wired network or a client device. Each access node can classify and treat data packets accordingly based on the presence of Quality of Service tags.

Another embodiment includes the wireless access nodes having a plurality of wireless node interfaces. That is the access node has different node interfaces in which each node interface typically has some sort of performance strength or quality. Examples of possible interfaces includes a 2.4 GHz interface, a 5 GHz interface, a WiMAX interface, 3G interface, and a 4G interface. Once the wireless access node classifies the data packets of the identified flow of data packets as requiring a predetermined quality of service, the wireless access node selects at least one of a plurality of node interfaces based on the classification of the data packet, and performance characteristics of the node interfaces. The wireless access node then forwards the data packet over the at least one selected node interface.

The node interfaces selection based on the classification of the data packet generally includes determining performance characteristics of the node interfaces, and matching the performance characteristics of the node interfaces with the classification of the data packet. Examples of determining the node interface performance characteristics includes one or more of determining whether the interface is alive, a security level associated with the interface, latency associated with the selected route over that interface, a capacity or throughput associated with the selected route over that interface, a reliability of the selected route over that interface, the cost of the interface, a frequency band of the interface, whether the interface includes a licensed frequency band or an unlicensed frequency band, traffic load on the interface, air-time utilization or noise level on the interface, etc.

Data packets classified as having a higher predetermined quality of service are given higher priority in forwarding to a next node over the at least one selected interface.

Figure 3:
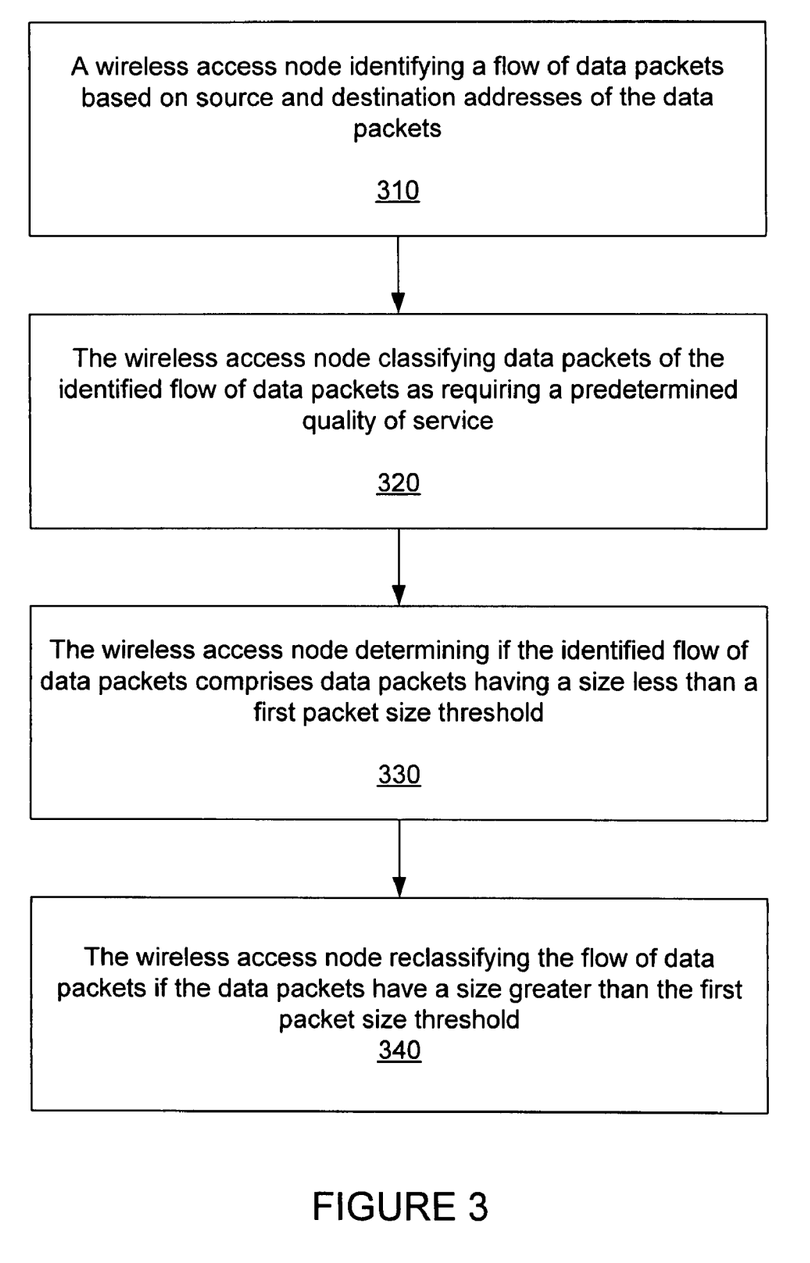
FIG. 3 is a flow chart that includes the steps of another example of a method of classifying data packets.

FIG. 3 is a flow chart that includes the steps of another example of a method of classifying data packets. A first step 310 includes a wireless access node identifying a flow of data packets based on source and destination addresses of the data packets. A second step 320 includes the wireless access node classifying data packets of the identified flow of data packets as requiring a predetermined quality of service. A third step 330 includes classifying the data packets as belonging to a particular application type if the identified flow of data packets includes data packets having a size less than a first packet size threshold. A fourth step 340 includes reclassifying the data packets of the flow if the size later exceeds the first packet size threshold.

The classification can additionally include determining if the identified flow of data packets includes data packets having a size greater than a second packet size threshold. For other embodiments, the classification can additionally include determining if the identified flow of data packets comprises an inter-arrival time less than a first inter-arrival threshold, and an inter-arrival time greater than a second inter-arrival threshold.

Figure 4:
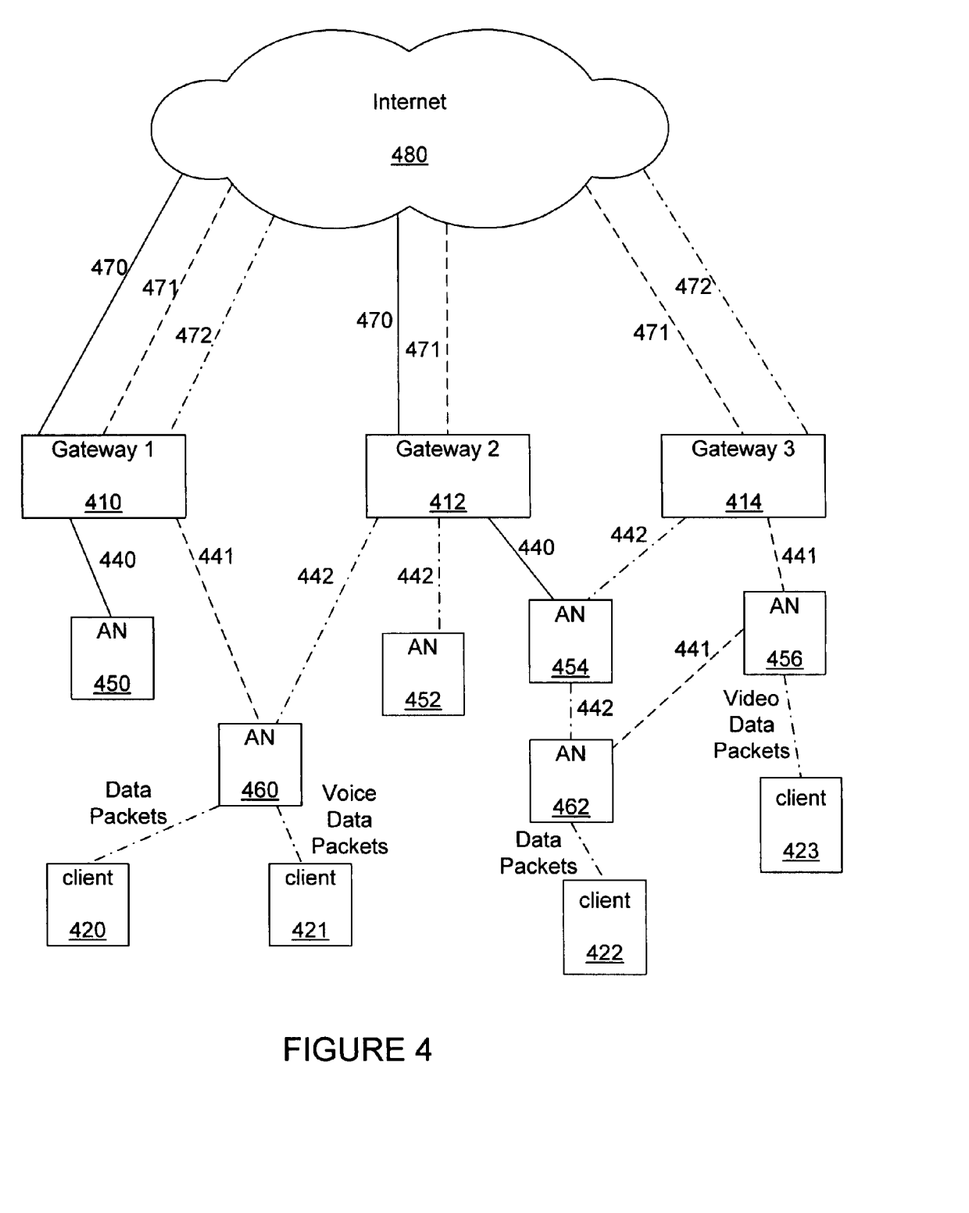
FIG. 4 shows an example of a wireless mesh network that includes methods of classifying data packets, and servicing the data packets according to the classifications.

FIG. 4 shows an example of a wireless mesh network that includes methods of classifying data packets, and servicing the data packets according to classifications of data packets. The wireless mesh network includes multiple wireless access nodes (wireless gateways) 410, 412, 414. For this embodiment, at least some of the wireless access nodes include multiple types of node interfaces 440, 441, 442. The wireless access nodes 410, 412, 414 can operate using any number of the node interfaces 440, 441, 442 depending on the data load and/or the data type being routed through the wireless access nodes 410, 412, 414. The node interfaces 440, 441, 442 are connected to an upstream wired network 480, such as, the internet 480. The wireless access nodes 410, 412, 414 provide client devices 420, 421 with access to the internet 480. Each of the node interfaces 440, 441, 442 can include a characteristic that makes it unique with respect to the other node interfaces 440, 441, 442, making it more or less desirable for voice or video data packets.

Another embodiment includes each of the wireless access nodes advertising the node interfaces of the wireless access node. The advertisements can be received by client devices that may or may not associate with the wireless network. Based on the advertised wireless access node uplink interfaces, the client devices can decide whether to associate with the network, and if associating, which wireless access node to associate with. That is, the client devices can to at least some extent, select which wireless access node to associate with based on the node interfaces being advertised by the wireless access node. As will be described, one method of advertising the node interfaces includes appending node interface information to beacons (for example, 802.11 beacons) that are continually broadcast by the wireless access nodes.

FIG. 4 shows also includes wireless access nodes (such as nodes 450, 452, 454, 456, 460, 462) that include multiple upstream interfaces 440, 441, 442 and/or multiple downstream interfaces 440, 441, 442. Either or both of the upstream interfaces and the downstream interfaces can be selected based upon data packet classifications. That is, the wireless access nodes 450, 452, 454, 456, 460, 462 can base routing of packets through each of the interfaces base on a classification of the data being routed. The wireless access nodes 450, 452, 454, 456, 460, 462 provide client devices 420, 421, 422, 423 access to the internet 480.

Each wireless access node can advertise the uplink and downlink node interfaces available. The advertisement can be broadcast on one or more of the available down link node interfaces, allowing client devices to base selection of which wireless access node to associate with based on the advertised node interfaces.

Access Node Routing Selections

Access nodes 450, 452, 454, 456, 460, 462 are coupled either directly or indirectly to the gateways 410, 412, 414. That is, each access node is either directly connected to one of the upstream gateways 410, 412, 414, or indirectly connected through another access node to one of the upstream gateway 410, 412, 414. Many factors determine which upstream node a node is connected to, including the backhaul interfaces of the gateways 410, 412, 414. The mesh network of FIG. 4 can include any number of additional gateways and access nodes.

For an exemplary embodiment, the gateways 410, 412, 414 transmit (for example, by broadcast) routing packets (beacons), which can be used to determine routing paths between access nodes 450, 452, 454, 456, 460, 462 and the gateways 410, 412, 414 of the network. The beacons are received by all first-level access nodes (for example, access nodes 450, 452, 454, 456), which are access nodes that are able to receive gateway transmitted beacons, and directly route data through to a gateway.

The beacons originated at the gateways include an identifier of the gateway and interface availability of the gateway. The beacons are used to establish a route from each access node to a gateway. The first level access nodes re-transmit (for example, by re-broadcast) the beacon data, attaching their own information to the beacon. The information indicates to the second level access nodes that an available path to the gateway includes the first level access node. The rebroadcast information can include the addresses of all upstream access nodes along the path to the gateway access node, and the types of interfaces available at each of the upstream access nodes and gateways. That is, an embodiment includes each access node that receives routing beacons, modifying the routing beacons of a selected route by attaching an address of the access node and the interface types of the access node, and re-broadcasting the modified beacons.

For one embodiment, the link quality of the beacon received determines whether that beacon is rebroadcast by the access node. If the quality of the beacon is above a determined threshold, it is rebroadcast. Alternatively, if the quality of the beacon is greater than the quality of all other received beacons, the beacon is rebroadcast. Another embodiment includes each access node only re-broadcasting beacons received from its currently-chosen default gateway (the default gateway is the last selected upstream gateway).

Beacons can be used to determine the quality of the link in both an upstream (towards a gateway) direction, and in a downstream (away from a gateway) direction. Additionally the quality of a link can be influenced by the size of the cluster the link is connected to. The upstream and the downstream direction link qualities, and the cluster size can be used by each access node to select the best data routing path to a gateway. The link qualities can be influenced by other wireless transmission factors such as interference, noise and fading. The link qualities can be determined by calculating the percentage of beacons that are transmitted and successfully received. The link qualities can alternatively or additionally be determined by measuring a PER, BER or SNR of received routing beacons. As described, the link qualities can be influenced by the interfaces available at the device (gateway or access node) that is transmitting the beacon.

The various backhaul interfaces and link interfaces (uplink and downlink) can differ in multiple ways. Similarly the different wired and wireless interfaces on an access node can differ in multiple ways. Some wireless links are more reliable than others. Some backhaul options or wireless links have higher capacity than others. Some backhaul options are more secure than others. Some backhaul options are more inexpensive to use than others.

Embodiments of gateways incorporate intelligence about these different characteristics of the different backhaul options on its backhaul interfaces to take the above-listed differences as well as operator-specified rules and preferences into consideration in routing traffic over these backhaul links. Embodiments of access nodes incorporate intelligence about these different characteristics of its different wireless interfaces to take the above-listed differences as well as operator-specified rules and preferences into consideration in routing traffic over these wireless interfaces. The rules can be implemented on a per-packet basis, as part of the routing decision for each packet received by an access node or gateway.

An embodiment of a gateway includes logic to periodically test the performance (throughput, latency and other measures), reliability and availability of the backhaul links on each of its interfaces. An embodiment of an access node includes logic to periodically test the performance (throughput, latency and other measures), reliability and availability of the wireless links on each of its wireless interfaces.

In some applications, a given backhaul interface may only be usable for a specific application or to carry data traffic from a specific user group. For example, an operator may specify that a specific unlicensed frequency band or channel is to be used exclusively to transport video traffic.

In one embodiment, an access node can identify and classify traffic based on application characteristics and heuristics. For example, voice traffic has certain characteristics (small packets, regularly spaced in time) that might be used to reliably identify a traffic stream as carrying voice, even if no identifiers in a packet or frame identify the application class as voice.

In some embodiments, it may be desired to incorporate a preference for transporting certain types of data over certain backhaul interfaces. For example, for reasons of reliability, it may be desired to preferentially transport video surveillance traffic over a backhaul interface that consists of a wireless link operating over licensed spectrum. The gateway may incorporate this preference in its routing logic. However, the routing logic may be capable of overriding this preference in the event that the preferred backhaul interface is identified as offering poor performance or lower performance than some other backhaul interface that is available to be used based on the operator-specified rules.

As previously described, the access nodes 450-462 can select routing paths to upstream gateways. However, the access nodes can include multiple uplink interfaces. For example, access node 454 is shown having uplink interfaces 440, 442. Therefore, based on the availability and quality of the downlink interfaces of the gateways 410, 412, 414, the access nodes can select multiple routing paths to multiple upstream gateways. That is, for example, the access node 454 may select gateway 412 because of its availability of an interface (such as, interface 440, which could be, for example, a low-latency interface) that is dedicated to voice data traffic. However, for general data packets, a different interface (such as, interface 442) may provide a higher quality routing path to the upstream gateway 414.

Multiple Routing Selections

The gateways, and the first-order and second-order access node can all have multiple uplink interfaces and multiple downlink interfaces. As previously described, the availability of interfaces can be included within the routing beacons. The availability of multiple interfaces on the uplinks and downlinks enable multiple routing paths to multiple gateways to be selected by the access nodes. That is, any access node can select multiple routing paths to one or more upstream gateways.

As shown in FIG. 4, for example, the second-order access node 462 has multiple possible routing paths to the gateways 412, 414. Potentially two routing path can be selected to a single gateway 414, and additionally or alternatively, a routing path can be selected to the gateway 412. The downstream access nodes can receive routing beacons over multiple interfaces, and therefore, can select different routing paths through different combinations of downlink and uplink interfaces.

Generally, selecting at least one of a plurality of node interfaces based on the classification of the data packet includes determining performance characteristics of the node interfaces and performance characteristics of the wireless links over those node interfaces, and matching these performance characteristics with the classification of the data packet. A non-exhaustive list of exemplary performance characteristics includes information of whether the interface is alive, a security of the interface, a latency associated with the selected routing path over that interface, a capacity or throughput associated with the selected routing path over that interface, reliability associated with the selected routing path over that interface, cost of the interface, a frequency band of the interface, whether the interface includes a licensed frequency band or an unlicensed frequency band, traffic load on the interface, air-time utilization or noise level observed on the interface. Additionally, selecting the access node interfaces based on the classification of the data packet can include receiving preferences specified by a network operator, and matching the node interfaces with the classification of the data packet based on the specified preferences.

For an embodiment, the wireless access node periodically tests performance characteristics of the node interfaces and the wireless links over those interfaces. More specifically, a gateway or access node can include logic to periodically test performance (throughput, latency and other measures) reliability and availability of the backhauls and wireless links on each of its interfaces.

Data classification of the data packets enables the wireless access node to optimally select the best node interfaces for different types of data packets. For example, public safety data packets can be routed through a node interface (such as, a 4.9 GHz wireless link) that is dedicated to public safety information.

As previously described, an embodiment of the wireless mesh network includes gateways that originate routing beacons. The routing beacons can include interface characteristics information in routing beacons originating at the gateways, allowing downstream devices to factor the available node interfaces into routing selection decisions. As previously described, the node interfaces can include either or both upstream links and down stream links of gateways and access node of the wireless mesh network.

Access nodes of the wireless mesh network can select one or more routing paths to one or more gateways based at least in part on backhaul interfaces advertised by upstream gateways. Once a routing path has been selected, one embodiment includes the access nodes rebroadcasts routing beacons successfully received through a selected routing path, wherein the rebroadcast beacons additionally include information of characteristics of node interfaces of the access node. Downstream access nodes can base selection of routing paths through upstream access node based at least in part on the availability of the node interfaces of the upstream access nodes.

A non-exhaustive list of examples of node interfaces includes 2.4 GHz interface, a 5 GHz interface, a WiMAX interface, 3G interface, a 4G interface. A non-exhaustive list of examples of data packet classification includes voice traffic, video traffic, 802.16 user data, 802.11 user data, public safety video traffic, public safety voice traffic.

Figure 5:
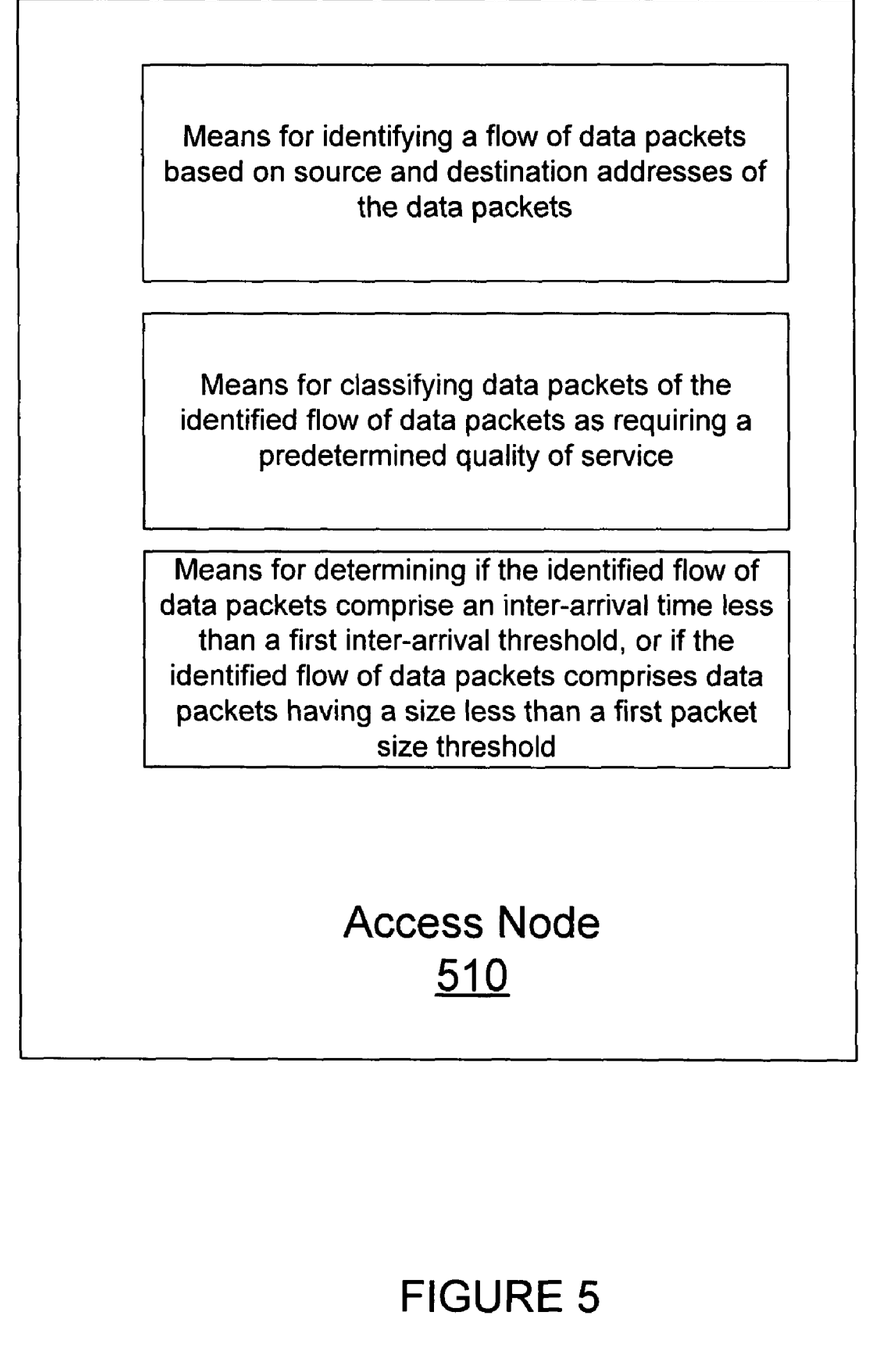
FIG. 5 shows an example of an access node that includes at least one method of classifying data packets.

FIG. 5 shows an example of an access node 510 that includes at least one method of classifying data packets. The access node 510 includes means for identifying a flow of data packets based on source and destination addresses of the data packets, means for classifying data packets of the identified flow of data packets as requiring a predetermined quality of service, and means for determining if the identified flow of data packets comprise an inter-arrival time less than a first inter-arrival threshold, or if the identified flow of data packets comprises data packets having a size less than a first packet size threshold.

Figure 6:
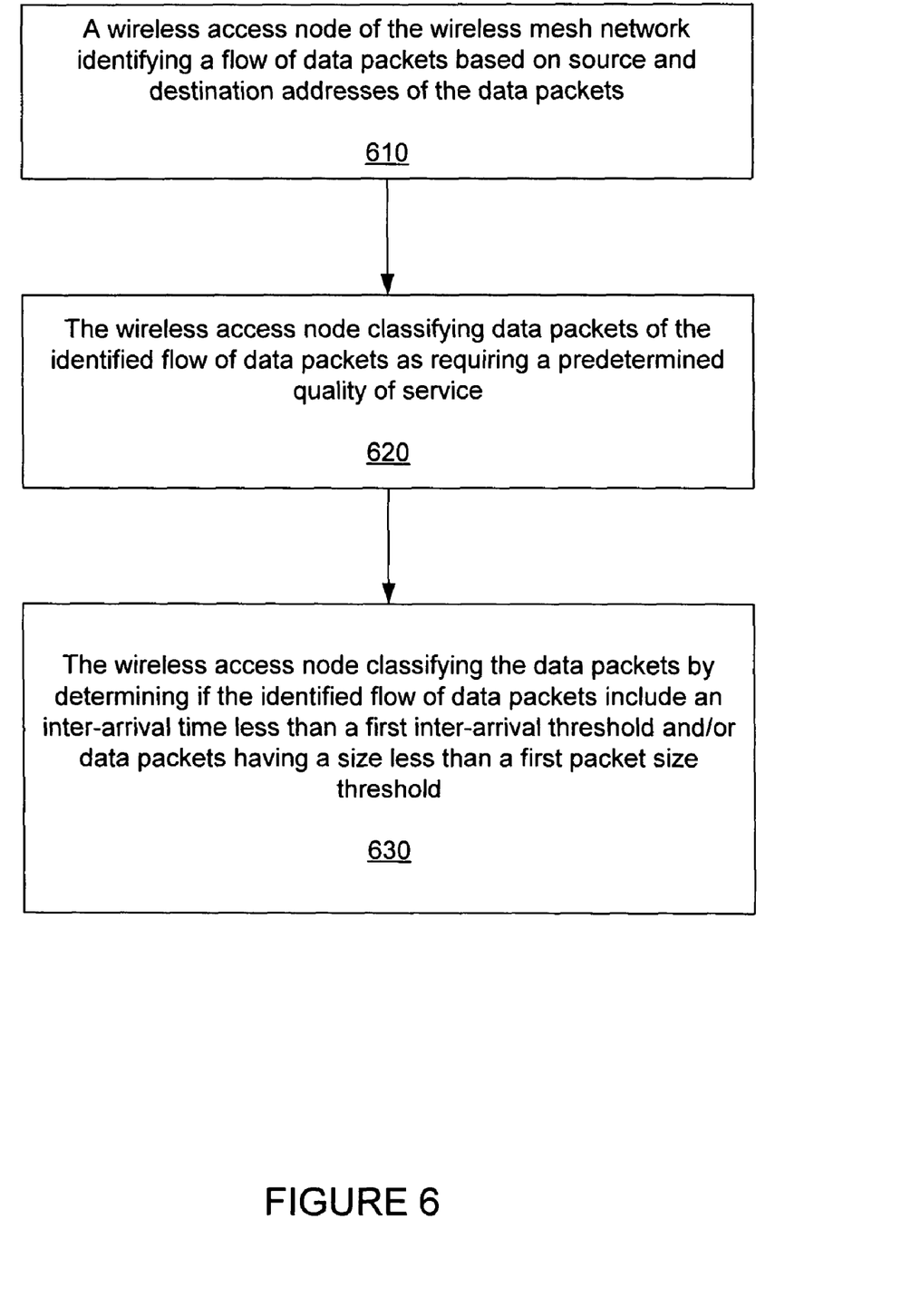
FIG. 6 is a flow chart that includes steps of an example of a method of a wireless mesh network classifying data packets, and servicing accordingly.

FIG. 6 is a flow chart that includes steps of an example of a method of a wireless mesh network classifying data packets, and servicing accordingly. A first step 610 includes a wireless access node of the wireless mesh network identifying a flow of data packets based on source and destination addresses of the data packets. A second step 620 includes the wireless access node classifying data packets of the identified flow of data packets as requiring a predetermined quality of service. A third step 630 includes the wireless access node classifying the data packets by determining if the identified flow of data packets include an inter-arrival time less than a first inter-arrival threshold and/or data packets having a size less than a first packet size threshold.

Although specific embodiments have been described and illustrated, the described embodiments are not to be limited to the specific forms or arrangements of parts so described and illustrated. The described embodiments are limited only by the appended claims.

What is claimed:

1. A method of classifying data packets comprising:
   identifying, by a wireless access node, a flow of data packets based on source and destination addresses of the data packets, the wireless access node comprising a plurality of flows of data packets;
   classifying, by the wireless access node, data packets of the identified flow of data packets as requiring a predetermined quality of service, comprising;
      determining if the identified flow of data packets comprise an inter-arrival time less than a first inter-arrival threshold; wherein
      if the wireless access node classifies the data packets of the identified flow of data packets as requiring the predetermined quality of service, then selecting, by the wireless access node, at least one of a plurality of node interfaces based on the classification of the data packets of the identified flow of data packets, and performance characteristics of the node interfaces, and forwarding, by the wireless access node, the classified data packets over the at least one selected node interface.

2. The method of claim 1, wherein classifying data packets of the identified flow of data packets as requiring the predetermined quality of service further comprises:
   determining if the identified flow of data packets comprise an inter-arrival time greater than a second inter-arrival threshold.

3. The method of claim 1, wherein classifying data packets of the identified flow of data packets as requiring the predetermined quality of service further comprises:
   determining if the identified flow of data packets comprises data packets having a size greater than a first packet size threshold, and less than a second packet size threshold.

4. The method of claim 1, wherein identifying a flow of data packets based on source and destination addresses of the data packets comprises inspecting source and destination addresses of the data packets and identifying a continual flow of data packets between inspected source and destination addresses.

5. The method of claim 1, wherein identifying a flow of data packets based on source and destination addresses of the data packets further comprises the wireless access node verifying the flow of data packets is bi-directional between source and destination addresses.

6. The method of claim 5, wherein the verifying the flow of data packets is bi-directional comprises identifying the bi-directional flow of data packets based on source and destination addresses of the data packets.

7. The method of claim 6, wherein identifying the bi-directional flow comprises inspecting source and destination addresses of the data packets and identifying a bi-directional continual flow of data packets between inspected source and destination addresses.

8. The method of claim 1, further comprising reclassifying the flow of data packets if the inter-arrival time is greater than the first inter-arrival threshold.

9. The method of claim 1, further comprising reclassifying the flow of data packets if the data packets comprise at least one of data packets having a size less than a first packet size threshold, and data packets have a size greater than a second packet size threshold.

10. The method of claim 1, wherein if the wireless access node classifies the data packets of the identified flow of data packets as requiring the predetermined quality of service, then the wireless access node tags the classified data packets of the identified flow with Quality of Service tags.

11. The method of claim 10, wherein the wireless access node is part of a wireless mesh network, and neighboring wireless access nodes classify the data packets based on the Quality of Service tags.

12. The method of claim 1, wherein selecting at least one of a plurality of node interfaces based on the classification of the data packet comprises:
   determining performance characteristics of the node interfaces; and
   matching the performance characteristics of the node interfaces with the classification of the data packet.

13. The method of claim 1, wherein the performance characteristics comprise at least one of whether the interface is alive, a security associated with the interface, latency associated with the interface, a capacity of the interface, throughput of the interface, reliability of the interface, cost of the interface, a frequency band of the interface, whether the interface includes a licensed frequency band or an unlicensed frequency band, traffic load of the interface, air-time noise of the interface.

14. The method of claim 1, wherein data packets classified as having a higher predetermined quality of service are given higher priority in forwarding to a next node over the at least one selected interface.

15. A method of classifying data packets comprising:
   identifying, by a wireless access node, a flow of data packets based on source and destination addresses of the data packets, the wireless access node comprising a plurality of flows of data packets;
   classifying, by the wireless access node, data packets of the identified flow of data packets as requiring a predetermined quality of service, comprising;
      determining if the identified flow of data packets comprises data packets having a size less than a first packet size threshold; wherein
      if the wireless access node classifies the data packets of the identified flow of data packets as requiring the predetermined quality of service, then the selecting, by the wireless access node, at least one of a plurality of node interfaces based on the classification of the data packets of the identified flow of data packets, and performance characteristics of the node interfaces, and forwarding, by the wireless access node, the classified data packets over the at least one selected node interface.

16. The method of claim 15, wherein-classifying data packets of the identified flow of data packets as requiring the predetermined quality of service further comprises:
   determining if the identified flow of data packets comprises data packets having a size greater than a second packet size threshold.

17. The method of claim 15, wherein classifying data packets of the identified flow of data packets as requiring the predetermined quality of service further comprises:
   determining if the identified flow of data packets comprises an inter-arrival time less than a first inter-arrival threshold, and an inter-arrival time greater than a second inter-arrival threshold.

18. The method of claim 15, wherein the wireless access node identifying a flow of data packets based on source and destination addresses of the data packets comprises the wireless access node inspecting source and destination addresses of the data packets and identifying a continual flow of data packets between inspected source and destination addresses.

19. The method of claim 15, further comprising reclassifying the flow of data packets if the identified flow of data packets comprises data packets having a size greater than the first packet size threshold.

20. The method of claim 15, wherein if the wireless access node classifies the data packets of the identified flow of data packets as requiring the predetermined quality of service, then the wireless access node tags the classified data packets of the identified flow with Quality of Service tags.

21. The method of claim 20, wherein the wireless access node is part of a wireless mesh network, and neighboring wireless access node classify the data packets based on the Quality of Service tags.

22. The method of claim 21, wherein data packets classified as having a higher predetermined quality of service are given higher priority in forwarding to a next node over the at least one selected interface.

23. A wireless access node that classifies data packets, comprising:

means for identifying a flow of data packets based on source and destination addresses of the data packets, the wireless access node comprising a plurality of flows of data packets;

means for classifying data packets of the identified flow of data packets as requiring a predetermined quality of service, comprising;

means for determining if the identified flow of data packets comprise an inter-arrival time less than a first inter-arrival threshold;

wherein if the data packets of the identified flow of data packets are classified as requiring the predetermined quality of service, then the wireless access node is operative to select at least one of a plurality of node interfaces based on the classification of the data packets of the identified flow of data packets, and performance characteristics of the node interfaces, and the wireless access node is operative to forward the classified data packets over the at least one selected node interface.

* * * * *